United States Patent [19]
DeSpain

[11] Patent Number: 5,659,141
[45] Date of Patent: Aug. 19, 1997

[54] APPARATUS FOR MEASURING MINUTE FORCES

[75] Inventor: Ronald R. DeSpain, Temecula, Calif.

[73] Assignee: McDonnell Douglas Corporation, Huntington Beach, Calif.

[21] Appl. No.: 710,808

[22] Filed: Sep. 23, 1996

[51] Int. Cl.$^6$ .................................................. G01L 1/16
[52] U.S. Cl. .............................. 73/862.68; 73/862.621
[58] Field of Search ................ 73/862.381, 862.391, 73/862.451, 862.471, 862.621, 862.68, 862.69, 779, 789, 828; 177/210 EM, 161

[56] References Cited

U.S. PATENT DOCUMENTS

| | | | |
|---|---|---|---|
| 1,882,932 | 10/1932 | Roesen. | |
| 2,467,752 | 4/1949 | Howe. | |
| 3,151,481 | 10/1964 | Russell | 73/862.621 |
| 3,720,101 | 3/1973 | Kollmeyer | 73/161 |
| 3,969,930 | 7/1976 | Prevorsek et al. | 73/91 |
| 3,993,149 | 11/1976 | Harvey | 177/163 |
| 4,052,891 | 10/1977 | Bartlett | 73/144 |
| 4,112,752 | 9/1978 | Häfner et al. | 73/147 |
| 4,116,056 | 9/1978 | Bulychev et al. | 73/147 |
| 4,182,167 | 1/1980 | Nakayama et al. | 73/144 |
| 4,279,165 | 7/1981 | Yokoyama et al. | 73/826 |
| 4,630,473 | 12/1986 | Park et al. | 73/161 |
| 5,051,919 | 9/1991 | Deuar | 364/508 |
| 5,127,275 | 7/1992 | Liquore | 73/862.39 |
| 5,454,272 | 10/1995 | Miller et al. | 73/862.41 |

*Primary Examiner*—Elizabeth L. Dougherty
*Attorney, Agent, or Firm*—Harness, Dickey & Pierce, P.L.C.

[57] ABSTRACT

An apparatus for measuring forces across a flexible member is provided comprising a non-extensible element suspended between a pair of supports. The non-extensible element is operably coupled to a flexible member for translating forces applied to the non-extensible element to the flexible member. A pair of equally massed weight dishes are suspended from said non-extensible element on opposite sides of the flexible member. By incrementally adding weights to one of the weight dishes, the flexible member is incrementally displaced. An Eddy Current System operably communicates with the flexible member for detecting the displacement. The displacement and load are used to calibrate a stress-strain curve of the flexible member.

14 Claims, 1 Drawing Sheet

APPARATUS FOR MEASURING MINUTE FORCES

BACKGROUND OF THE INVENTION

1. Technical Field

The present invention generally relates to force sensors and more particularly, force sensors capable of measuring extremely small forces.

2. Discussion

As is generally known in the art of force testing, sensors are utilized for measuring forces in horizontal and vertical directions. Generally, these sensors are first calibrated over an expected range prior to there use in measuring unknown forces. To accomplish this, conventional test instruments employ load cells or strain gauges for measuring a force directed on a flexible member. The strain gauges and load cells transform sensed mechanical force into an electrical signal. From the electrical signal, a stress-strain curve of the flexible member can be calibrated and the flexible member can be used in conjunction with the sensor in a stand alone capacity to measure forces directed across the flexible member.

To calibrate a flexible member using strain gauges, the strain gauges are usually coupled on opposite sides of the flexible member. The flexible member is then deflected by a displacement generator over a preset range. The stress-strain curve of the flexible member is calculated from the preset displacement and the measured load which is derived from the electrical signals generated by the strain gauges.

Similarly, flexible members can be calibrated through use of load cells and other force transducers. The flexible member is operably coupled to the load cell such that a load is applied thereto when the flexible member is displaced. The load and displacement are then used to calculate a stress-strain constant. Again, the flexible member and load cell can then be removed from the test apparatus and used to measure unknown forces.

However, conventional sensors, such as strain gauges and load cells, are not sensitive enough to measure very small forces, e.g., less than 0.1 grams, directed across the flexible member. Thus, the sensor and flexible member can not be used to measure minute forces, such as water drag on sea-going vessels or in flow tanks, air pressure from ducts and over surfaces and frictional forces in bearings. Furthermore, known calibration techniques are limited by stiction between components which is difficult to measure, eliminate, or account for when measuring minute forces. Also, many calibration techniques are restricted to utilizing forces directed in only a limited range due to system torque.

Therefore, it is desirable to provide an apparatus enabling simple and accurate calibrating of a flexible member. It is further desirable to provide an apparatus capable of calibrating a flexible member capable of measuring forces less than one tenth of a gram. Furthermore, it is desirable to provide an apparatus capable of redirecting forces to the direction of the force being measured.

SUMMARY OF THE INVENTION

The present invention is directed at providing an apparatus for measuring minute forces in any direction. Accordingly, the apparatus includes a non-extensible element suspended between a pair of supports. The non-extensible element is operably coupled to a flexible member for translating forces applied to the non-extensible element to the flexible member. A pair of equally massed weight dishes are suspended from said non-extensible element on opposite sides of the flexible member. By incrementally adding weights to one of the weight dishes, the flexible member is incrementally displaced. An Eddy Current System operably communicates with the flexible member for detecting the displacement. The displacement and load are used to calibrate a stress-strain curve of the flexible member.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
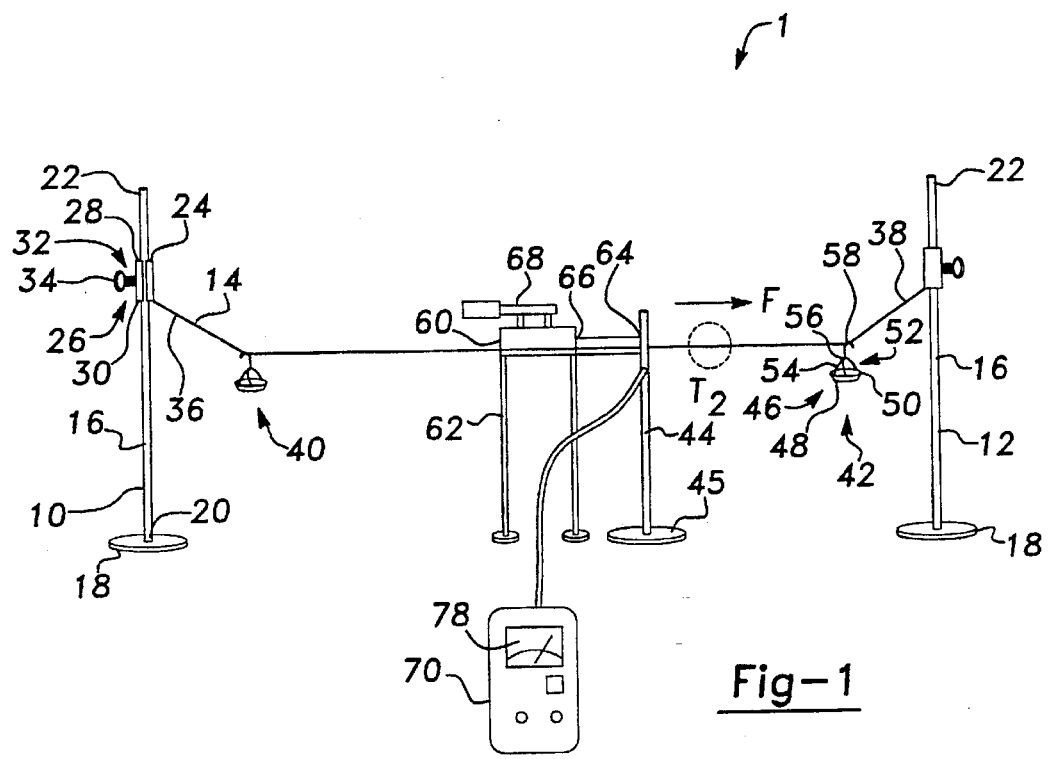
FIG. 1 is a schematic view of a force-sensing apparatus for measuring minute forces in any direction according to the present invention.

Referring to FIG. 1, an apparatus for measuring forces in any direction is shown generally at 1. Although the apparatus 1 is particularly wet-suited for measuring forces less than one-tenth of a gram, it is to be understood that the present invention can be used for measuring forces in a much greater range. As is generally known, a sensor and flexible member can be used to measure forces directed across the flexible member. To accomplish this however, a stress-strain curve must be calculated for the flexible member by calibrating the sensor and flexible member.

A stress-strain value of a flexible member may be calculated by applying a known force to the flexible member and measuring its displacement. Furthermore, the stress-strain value is able to be calculated by displacing the flexible member a present mount and measuring the load. The load and displacement are then used to plot a stress-strain curve for the flexible member. After the calibration, the flexible member can be utilized for measuring unknown forces directed across it by measuring its displacement under the unknown load and referring to the stress-strain curve for calculating force.

In calculating the stress-strain curve of the flexible member, it is critical to account for any torque in the system. The present invention allows accurate and simple calculations of force at very small load levels, e.g., less than one-tenth of a gram, or when the displacement of the flexible member is very small, e.g., 0.001–0.040 inches. Prior to the invention hereof, this has been difficult and the accuracy of the calculations has been jeopardized.

Still referring to FIG. 1, the force calibrating apparatus 1 includes a first upwardly-standing support stand 10 and a second upwardly-standing support stand 12. The second upwardly-standing support stand 12 is disposed a predetermined distance away from the first support 10 and a non-extensible element 14 is suspended therebetween.

Preferably, each of the first and second supports 10, 12 includes a vertically projecting elongated rod 16 and a base 18. The rod 16 is secured to the base 18 at a distal end 20 and extends vertically therefrom to a proximal end 22. It should be appreciated that a ring stand is preferred for this purpose since it does not bend, flex, or lean when subjected to predetermined loads.

A generally C-shaped clap 24 is removably secured to the rod 16 such that it may be variably secured at different locations along the rod 16. The clap 24 includes a slot 26 therein extending from a top surface 28 to a bottom surface 30 thereof. The slot 26 is adapted to receive the rod 16 therethrough and orient the clamp 24 partially circumferentially about the rod 16.

The clap 24 further includes a lateral Opening 32 therein for removably receiving a threaded member 34 therethrough. It has been found that a thumb screw is particularly well suited for this purpose. The lateral opening 32 is located adjacent the slot 26 so that the threaded member 34 may frictionally engage the rod 16. It should be noted that the specific clap 24 used is not critical so long as it adequately supports the non-extensible element 14 to be described in greater detail below.

The non-extensible element or string 14 is secured at a first end 36 to the first support member 10 and at a second end 38 to the second support member 12. Preferably, the string 14 is supported at its first and second ends 36, 38 by the clamps 24. In this way, the string 14 is vertically adjustable along the rods 16 by moving the clamps 24. The length of the string 14 and the distance between the supports 10, 12 are coordinated such that the non-extensible string 14 is suspended therebetween.

Although other substitute non-extensible elements 14 are readily available, in the preferred embodiment of the present invention, a ball chain non-extendible string is utilized. By using a ball-chain, the string 14 is not only non-extensible, but is also easily secured to the first and second support members 10, 12 and can be readily shortened or lengthened as required. Also, the troughs between subsequent balls along the string provide convenient locations for securing the weight dishes 40, 42 described in greater detail below.

A linearly flexible member 44, such as a metal plate, vertically extends from a stand 45 and is disposed along the expanse of the non-extendible string 14 between the supports 10, 12. Preferably, the flexible member 44 is located approximately at the mid-point between the first and second support members 10, 12 and is operably coupled to the non-extensible string 14 such that forces applied to the non-extensible string 14 are translated across the flexible member 44. Preferably, the flexible member 44 linearly deforms proportionately to the force directed thereon over a desired measurement range.

A first force applicator or weight dish 40 is suspended along the non-extensible string 14 between the flexible member and the first support stand 10. Additionally, a second force applicator or weight dish 42 is suspended along the non-extendible string 14 between the flexible member 44 and the second support stand 12. Preferably, the weight dishes 40, 42 include a cup-shaped dish 46 having a bottom surface 48 and upwardly projecting side walls 50 defining a void 52 for holding various weights (not shown).

The cup-shaped dish 46 is secured to three hanging arms 54 equidistantly spaced about a perimeter thereof. The hanging arms 54 extend upwardly from the cup-shaped dish 46 to an intersection point 56 above the bottom surface 48. A hook 58 is secured to the intersection 56 and upwardly projects therefrom. The hook 58 is adapted to overhang the string 14 such that the cup-shaped dish 46 is suspended therefrom. In this way, the weight dishes 40, 42 hang from the string 14 with the bottom surface 48 essentially horizontal so as to hold weights without spillage.

Although the weight dishes 40, 42 shown and described are preferred, it should be noted that many other designs are acceptable for this purpose. Preferably, the first weight dish 40 and the second weight dish 42 have equivalent mass when empty. In this way, when the empty weight dishes 40, 42 are suspended from the string 14 and the flexible member 44 is secured at the midpoint therebetween, zero force is applied across the flexible member 44. If the weight dishes 40, 42 have unequal mass, the system 1 must be balanced by adding weight to one weight dish 40, 42 or varying the location of the flexible member 44 between the support stands 10, 12.

A displacement generator 60 such as a micrometer is disposed between the flexible member 44 and the first support stand 10. It should be noted that the displacement generator could equally as well be placed between the flexible member 44 and the second support stand 12. The micrometer 60 is supported on a stand 62 and is secured at a first end 64 of a movable carriage 66 to the flexible member 44. A force transmitting arm 68 is rotatable to move the moveable carriage 66 thereby displacing the flexible member 44. A high-resolution Eddy current system 70 such as the Kaman KDM-7200-IUEP system, is operatively coupled to the flexible member 44 for detecting very small displacements thereof. Initially, the micrometer 60 is used in conjunction with the Eddy current system 70 to verify that the stress strain curve of the flexible member 44 is linear over an expected range.

Figure 2:
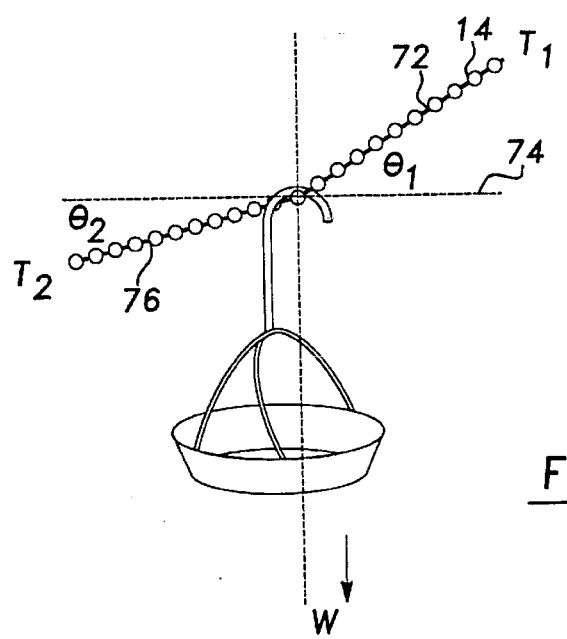
FIG. 2 is an enlarged sectional view of the force-sensing apparatus of FIG. 1 according to the present invention.

As shown in FIG. 2, the force applied parallel to $F_1(T_2)$ in FIG. 1, can be varied by any angle $(\theta_2)$ and the force value remains able to be calculated. As can be seen, the angle $\theta_1$ is defined between a first section 72 of the non-extensible string 14 and a horizontal axis 74. The angle $\theta_2$ is defined between the horizontal axis 74 and a second section 76 of the non-extensible string 14. A weight W represents the mass added to the weight dish. Thus, a force $T_2$ is able to be calculated through the formula $T_2=W/[\cos\theta_2 \tan\theta_1 - \sin\theta_2]$. It should be noted that in the preferred embodiment, as shown in FIG. 1, the angle $\theta 2$ equals 0 and the angle $\theta 1$ equals forty-five degrees. Therefore, the force $T_2$ equals the mass W.

The operation of the present invention will now be described in greater detail. In an initial mode, the first and second weight dishes 40, 42 are suspended from the non-extensible string 14. Since the weight dishes 40, 42 are equal in mass and are equidistant from the flexible member 44, zero force is placed across the flexible member 44. In a test mode, the force transmitting arm 68 of the displacement generator 60 is rotated across a pre-determined range to cause the moveable carriage 66 to move axially. The axial movement of the moveable carriage 66 displaces the flexible member 44 over a given range. The mechanical movement of the flexible member 44 is converted to electrical signals by the Eddy current system 70 and the volts per inch displayed thereon are checked to insure that they remain constant. In this way, the Eddy Current System 70 is used to verify that the displacement of the flexible member 44 is linear.

In a calibration mode, the flexible member 44 is returned to a normal, non-flexed position and preset weights are incrementally added to the second weight dish 42. By adding weight to the second dish 42 in incremental mounts, an increasing force $F_1$ is exerted in a first direction. The incremental weight displaces the flexible member 44 and generates a curve of force-to-volts on the Eddy Current System 70. Preferably, a high resolution display 78 is available on the Eddy Current System 70 for conveying the curve to the operator. The data is then combined to produce a stress-to-strain curve for the flexible member 44, which should be linear.

In a measuring mode, the flexible member 44 and Eddy Current System 70 are removed from the apparatus 1 and used to measure forces directed across the flexible member 44. To accomplish this, the flexible member 44 is positioned within a system to be measured and the displacement thereof generates a value on the Eddy current system 70 which is compared to the stress-strain data. From the comparison, a value corresponding to the force across the flexible member 44 is determined.

The present invention has been found capable of measuring forces even less than a tenth of a gram in any plane, without subjecting the flexible member 44 to out of plane torques. This accuracy has been maintained even when displacements are minute, such as 0.001–0.040 inches. The suspension of the weight dishes 40, 42 redirects small forces through the non-extensible string 14 into the direction of force measurement. This is superior to other methods which are limited by stiction. The suspension method also allows force measuring in any direction. Furthermore, no torque is applied out of the direction of the force being measured as along as the strain accompanying the force is small relative to the non-extensible string 14 length.

Accordingly, the present invention provides an apparatus for simply and accurately measuring forces across a flexible member. The present invention is particularly well suited for measuring forces less than one-tenth of a gram. Furthermore, the present invention re-directs small forces in the direction of the force being measured and is not limited by stiction. Moreover, the present invention allows force measurement in any direction without torques being applied out of the direction of the force being measured.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus comprising:

a suspended non-extensible element;

a flexible member coupled to said non-extensible element;

a plurality of force applicators suspended from said non-extensible element for displacing said flexible member by applying a force to said non-extensible element; and an Eddy Current System operably communicating with said flexible member for detecting said displacement.

2. The apparatus of claim 1 wherein said non-extensible element further comprises:

a first end secured to a first support; and a second end secured to a second support;

whereby said first support and said second support suspend said non-extensible element therebetween.

3. The apparatus of claim 2 wherein said non-extensible element further comprises a ball chain.

4. The apparatus of claim 1 wherein said plurality of force applicators comprise:

a first weight dish suspended from said non-extensible element on a first side of said flexible member; and a second weight dish suspended from said non-extensible element on a second side of said flexible member.

5. The apparatus of claim 4 wherein a mass of said first weight dish is equal to a mass of said second weight dish.

6. The apparatus of claim 1 further comprising:

a displacement generator operably secured to said flexible member for displacing said flexible member a predetermined amount.

7. The apparatus of claim 6 wherein said displacement generator comprises a micrometer.

8. An apparatus for measuring force directed across a flexible member comprising:

a first vertically extending support;

a second vertically extending support displaced from said first support;

a non-extensible element secured at a first end to said first support and secured at a second end to said second support so as to be suspended therebetween;

said non-extensible element being secured to said flexible member for translating a force applied to said non-extensible string to said flexible member;

a first weight dish suspended from said non-extensible element a given distance from said flexible member on a first side of said flexible member;

a second weight dish suspended from said non-extensible element said given distance from said flexible member on another side of said flexible member;

a displacement generator operably secured to said flexible member for displacing said flexible member a predetermined amount; and an Eddy Current System operably communicating with said flexible member for measuring said displacement of said flexible member.

9. The apparatus of claim 8 wherein said first support and said second support comprise ring stands.

10. The apparatus of claim 8 wherein said non-extensible string comprises a ball chain.

11. The apparatus of claim 8 wherein said flexible member comprises an upwardly projecting metal plate.

12. The apparatus of claim 8 wherein said displacement generator comprises a micrometer.

13. The apparatus of claim 8 wherein a mass of said first weight dish is equal to a mass of said second weight dish.

14. A method of calibrating a stress-strain curve of a flexible member comprising:

securing said flexible member to a suspended non-extensible element;

incrementally suspending weights from said suspended non-extensible element;

measuring an incremental displacement of said flexible member as said weights are incrementally suspended from said non-extensible element by an Eddy Current System operably communicating with said flexible member; and incrementally combining a mass of said weights and said displacement to determine said stress-strain curve.

\* \* \* \* \*

UNITED STATES PATENT AND TRADEMARK OFFICE
CERTIFICATE OF CORRECTION

PATENT NO. : 5,659,141
DATED : August 19, 1997
INVENTOR(S) : Ronald R. DeSpain

It is certified that error appears in the above-indentified patent and that said Letters Patent is hereby corrected as shown below:

Column 2, line 31, "wet-suited" should be --well-suited--.

Column 3, line 12, "clap" should be --clamp--.

Column 3, line 12, "Opening" should be --opening--.

Column 3, line 18, "clap" should be --clamp--.

Column 4, line 65, "mounts" should be --amounts--.

Signed and Sealed this

Eighteenth Day of November 1997

Attest:

BRUCE LEHMAN

Attesting Officer

Commissioner of Patents and Trademarks